Patented Nov. 13, 1923.

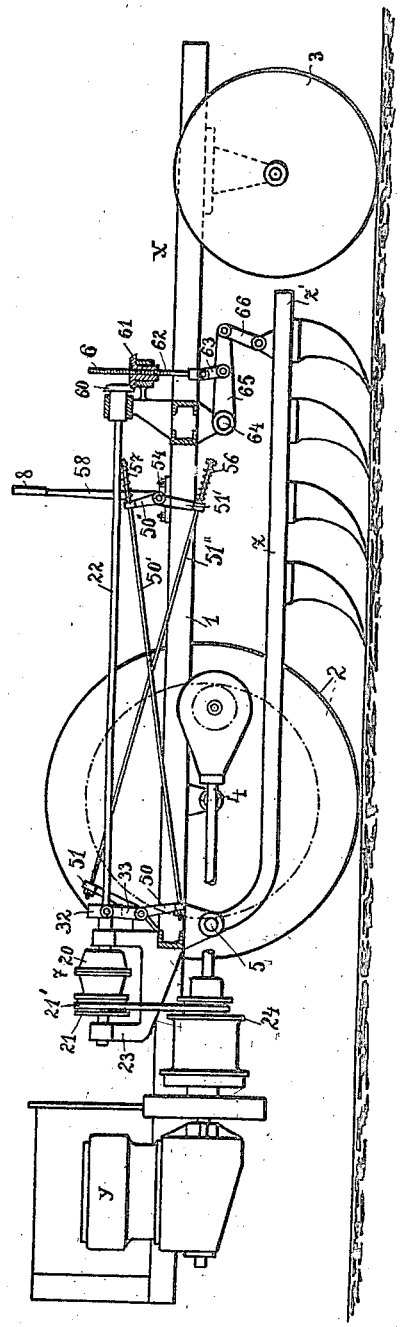

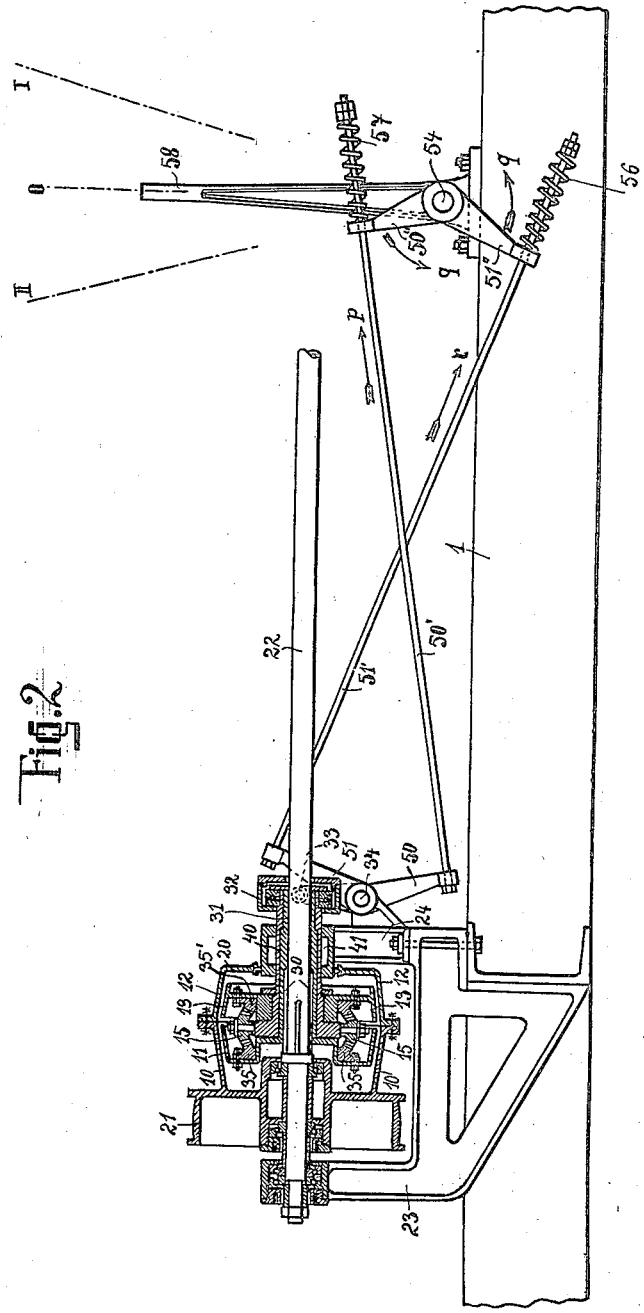

1,473,630

UNITED STATES PATENT OFFICE.

FRANK KEC, OF PRAGUE, CZECHOSLOVAKIA.

MOTOR PLOW.

Application filed August 23, 1919. Serial No. 319,480.

*To all whom it may concern:*

Be it known that I, FRANK KEC, managing director, citizen of the Republic of Czechoslovakia, residing at Prague, VIII, Cescomoravska tr. 205, (Czechoslovakia,) have invented certain new and useful Improvements in Motor Plows, of which the following is a specification.

This invention relates to motor plows in which the share frame is journaled in the plow frame. While motor plows in which the share frame is rigidly attached to the plow frame must be very carefully balanced for operating properly and nevertheless more particularly in case of varying hardness of the soil run irregularly and produce furrows of varying depths, plows in which the share frame is movable in the plow frame are open to the objection that even the most perfect ones, in which the share frame is connected at both ends to the plow frame by link parallelograms are very complicated in construction and for securing uniform depth of furrows must be provided with separate adjusting means at the furrow wheels or at the connection between the share frame and the plow frame. All these deficiencies may be removed as shown by experience according to the present invention by pivoting the share frame at one end only to the plow frame near the axle of driving wheels so that it is only the rear end of the share frame that is adjustable vertically by suitable means actuated by the motor through the medium of a mechanism thrown into and out of section at will by hand.

In the annexed drawing Fig. 1 is a side elevation of a motor plow embodying the present invention, Fig. 2 is a side elevation partly in section on a larger scale of the mechanism for vertically adjusting the share frame.

The motor plow consists of the vehicle body *x* of well known construction and of the share frame *z* pivoted to the plow frame and vertically adjustable by the plow motor *y* as hereinafter more fully described. The vehicle body *x* consists of the frame 1 supported by the land wheel and furrow wheel 2, 2 and the steering wheel 3 running on the unfurrowed land. The wheels 2, 2 are driven by the motor *y* in the well known manner; the steering wheel 3 is not vertically adjustable and is actuated in the usual manner by the driver.

The share frame *z* is pivoted to the plow frame 1 in front of the axle 4 of the driving wheels 2, 2 by means of a journal pin 5 and is vertically adjustable relatively to the plow frame only at its rear end by a suitable adjusting device 6 which as hereinafter more fully described may be operated from the motor *y* through the medium of a clutch mechanism 7 controlled by a suitable controlling device 8.

The clutch mechanism 7 comprises two clutches 10, 11 and 12, 13; one of the elements of each of the clutches as shown the elements 10, 12 is continuously driven by the motor, the other elements 11, 13 of the clutches are yieldingly connected with each other by a reversing mechanism 15, 15 as hereinafter more fully described so that when the clutch mechanism is brought into action for revolving in the one direction or in the other, the share frame *x* is raised or lowered. The two clutches of the clutch mechanism may be constructed in various ways; as shown in the drawing the two continuously driven halves 10, 12 constitute a casing 20 enclosing tightly all the other parts of the clutches. As shown the casing 20 is fast with a pulley 21 which together with the casing is mounted loosely on the shaft 22 leading to the adjusting device 6. The shaft 22 is supported by brackets 23, 24, Fig. 1; the pulley 21 is driven by the belt 21' from a pulley 24 forcing part of the gearing driven by the plow motor.

The clutch element 11 of the clutch mechanism is movable on keys 30 along the shaft 22 and provided with a sleeve 31 projecting from the casing which carries a shifting sleeve 32. Two levers 33 engage into the sleeve 32, the levers 33 are keyed to a rocking shaft 34 actuated by the lever 8. The clutch element 11 carries a bevel wheel 35 cooperating with the reversing mechanism as hereinafter described; the reversing mechanism 15, 15 is mounted on a hollow shaft 40 extending into the casing 20 and adapted to move longitudinally but prevented from revolving by suitable means such as keys 41.

The element 13 of the clutch mechanism is free to revolve on the sleeve 40 and carries a bevel wheel 35' cooperating with the reversing mechanism.

Two levers 50, 51 are secured to the rocking shaft 34 and through each of them a rod 50', 51' is threaded the other end of which is threaded through an arm 50″ or 51″ respectively on a rocking shaft 54 such other end carrying a spring 56 or 57 respectively. The shaft 54 also carries a hand lever 58 arranged as usual within the reach of the driver, which occupies the position O when the clutch mechanism is thrown out of action and the position I or II when the clutch mechanism is thrown into action for running in the one or in the other direction. The movement of the clutch mechanism and of the shaft 22 is utilized to actuate a vertical adjusting screw 62 by the gearing 60, 61. The screw 62 is connected to a lever 65 fulcrumed at 64 by a link 63, and the lever 65 is connected by a link 66 to the rear part $z'$ of the share frame.

The plow above described runs very uniformly and secures a uniform depth of the furrows even if the hardness of the soil varies and its construction is very simple. For increasing the depth of the furrows it is only necessary to bring the hand lever 58 from the O position to the position I. The rod 50′ is thereby moved in the direction of the arrow $p$ against the action of the spring 57 and the parts 11, 15, 13 enclosed in the casing 20 are shifted to the left through the medium of the parts 50, 34, 33 so that the clutch element 11 and the clutch element 10 come into engagement with each other and are thrown into action and the shaft 22 leading to the adjusting device 6 is revolved in the same direction as the pulley 21. The reversing mechanism 15, 15 causes the clutch element 13 which is out of engagement with the element 11 and hence inoperative to revolve in the opposite direction. After the desired vertical adjustment has been obtained the hand lever 58 is simply released and then returns into the O position under the action of the spring 57 moving the arm 51″ in the direction of the arrow $q$. Thereby the spring 56 of the rod 51′ is slightly compressed and the rod 51′ and the arm 51 are moved in the direction of the arrow $r$. This movement is transmitted through the parts 34, 33 to parts 11, 15, 13 within the casing 20 returning them from the operative left hand position to the inoperative central position shown in Fig. 2. In this position the tensions of the springs 56, 57 are in equilibrium.

If it is desired to raise the share frame it is only necessary to bring the hand lever 58 from the position O to position II; thereby the parts 11, 15, 13 are shifted to the right, the clutch element 13 is brought into engagement with the element 12 and the shaft 22 leading to the adjusting device 6 is revolved in the opposite direction to pulley 21 through the medium of the reversing mechanism 15, 15, the bevel wheels 35′, 35 and the sleeve 31 of the clutch element 11 which as already stated is keyed upon the shaft 22.

Having thus described my invention and explained the mode of operation thereof, I claim and desire to secure by Letters Patent:

1. In a motor plow the combination of a plow frame and axle and driving wheels a share frame pivoted to the plow frame at a point in proximity to the said axle and means for vertically adjusting the other end of the share frame such means comprising a vertical screw spindle a lever fulcrumed in the plow frame a link connecting the screw spindle with the lever and another link connecting the lever with the share frame.

2. In a motor plow the combination with a share frame pivoted at one end and having its opposite end provided with a link pivot receiving opening, of means mounted in said plow machine for raising and lowering the free end of said share frame, said means comprising a one armed lever pivotally supported at one end to the machine, a link connected at one end to the opposite end of said lever and at the other end is engaged in the said opening at the free end of said share frame, a second link pivoted to the intermediate portion of said lever and projecting upwardly at its other end, an axially movable screw member pivoted at its lower end to the upper end of said last named link, and a pair of rotatably mounted gears supported in the machine, one of said gears being provided with a threaded opening adapted to receive said screw, whereby rotary movement of said gears will cause upright axial movement of said screw to raise and lower the free end of said share frame about its pivot.

3. In a motor plow the combination with a share frame pivoted at its forward end to the machine, of a lifting lever mechanism carried by said machine and adapted to cooperate with the free end of said share frame to raise and lower the latter with respect to the ground line, a screw projecting upwardly from said lever mechanism, a set of gears rotatably supported above said screw, one of said gears being provided with a threaded bore adapted to receive said screw, a longitudinal shaft fixed at one end in the other of the said gears and adapted to be rotated to operate the lifting mechanism, and means for controlling the direction of rotation of said shaft to raise and lower the screw supporting the free end of the share frame.

In testimony whereof I affix my signature in presence of two witnesses.

FRANK KEC.

Witnesses:
 FREHALY,
 FROSHWERTSWART.